(12) United States Patent
Ottman (10) Patent No.: US 11,035,341 B1
(45) Date of Patent: Jun. 15, 2021

(54) SYSTEM AND METHOD FOR RESTARTING A WIND TURBINE

(71) Applicant: Dawn Emily Ottman, Shadehill, SD (US)

(72) Inventor: Dawn Emily Ottman, Shadehill, SD (US)

( * ) Notice: Subject to any disclaimer, the term of this patent is extended or adjusted under 35 U.S.C. 154(b) by 0 days.

(21) Appl. No.: 16/864,532

(22) Filed: May 1, 2020

Related U.S. Application Data

(63) Continuation-in-part of application No. 14/695,795, filed on Apr. 24, 2015, now abandoned.

(60) Provisional application No. 61/996,023, filed on Apr. 28, 2014.

(51) Int. Cl.
*F03D 7/02* (2006.01)
*F03D 9/11* (2016.01)
*F03D 9/00* (2016.01)

(52) U.S. Cl.
CPC ........... *F03D 7/0204* (2013.01); *F03D 9/007* (2013.01); *F03D 9/11* (2016.05)

(58) Field of Classification Search
CPC ........... F03D 7/0204; F03D 9/11; F03D 9/007
USPC .......................................................... 290/44
See application file for complete search history.

(56) References Cited

U.S. PATENT DOCUMENTS

| | | |
|---|---|---|
| 4,551,631 A | 11/1985 | Trigilio |
| 5,075,564 A | 12/1991 | Hickey |
| 5,254,876 A | 10/1993 | Hickey |
| 6,097,104 A | 8/2000 | Russell |
| 6,372,978 B1 | 4/2002 | Cifaldi |
| 7,045,702 B2 | 5/2006 | Kashyap |
| 7,345,374 B1 | 3/2008 | Jones et al. |
| 8,288,884 B1 | 10/2012 | Malcolm |
| 8,432,053 B2 * | 4/2013 | Frayne ...................... F03D 9/11 290/44 |
| 2008/0047270 A1 | 2/2008 | Gilbert |
| 2008/0148733 A1 | 6/2008 | Fein et al. |
| 2008/0150289 A1 | 6/2008 | Fein et al. |
| 2010/0207453 A1 * | 8/2010 | Ottman ................... H02S 10/12 307/72 |
| 2011/0049992 A1 * | 3/2011 | Sant'Anselmo ........ H02S 10/10 307/64 |
| 2014/0265598 A1 | 9/2014 | Isabella |

* cited by examiner

*Primary Examiner* — Charles Reid, Jr.
(74) *Attorney, Agent, or Firm* — Maier & Maier, PLLC (57) ABSTRACT

A solar and wind energy collection system, wherein solar power is gathered to perform the task of restarting the wind turbine. The system includes a wind turbine assembly with the wind turbine assembly including a plurality of wind turbine blades, a control system, a wind turbine blade positioning motor, a support structure, a solar energy collecting system including a thin film solar amorphous silicon photovoltaic material secured to the wind turbine support structure, and a wind turbine blade positioning control system that is operatively connected to the solar energy collecting system and the wind turbine blade positioning motor.

20 Claims, 9 Drawing Sheets

SYSTEM AND METHOD FOR RESTARTING A WIND TURBINE

CROSS-REFERENCE TO RELATED APPLICATIONS

This application is a continuation-in-part of U.S. application Ser. No. 14/695,795, filed Apr. 24, 2015, which claims priority under 35 U.S.C. § 119 to U.S. Provisional Application Ser. No. 61/996,023, filed Apr. 28, 2014, contents of which is herein incorporated by reference in its entirety.

FIELD

The present invention relates generally to wind turbines. More specifically, the present invention relates to a solar and wind energy collection system, including a solar energy collecting system adhered to a wind turbine's tower wherein the solar energy system is preferably including thin film photovoltaics and where one or more photovoltaic cells collect energy from light to generate electricity. This locally generated electricity is then used for restarting the wind turbine thus increasing the reliability of wind turbines to generate power.

BACKGROUND

Wind energy power has been used for centuries. Initially in mills, then for pumping water and more recently, wind turbines have been introduced to generate electricity for use by consumers. In recent decades, wind energy has become a viable source of energy production and it is in the mix of energy options provided to a consumer by electric companies who have realized greater stability by the inclusion of renewable energies into their energy generation profile.

In recent years, this significant increase in the use of wind energy, a renewable energy, is due to environmental and economic concerns coupled with improvements in technology that have greatly increased the efficiency and cost per kilowatt (kW) of these systems. Improvements in both materials and turbine design have increased the efficiency and decreased the cost per kW of power produced.

However, the approach still has certain drawbacks, including the dependence on variable environmental factors like adequate wind speed and the cost competitiveness with fossil fuels. Once factored in, other costs such as pollution and environmental damage give reason to pause and encourage an increased use of renewable energy sources.

Besides wind turbine systems, other environmentally friendly systems have also made great strides of late. For example, solar power has benefitted from the development of thin film photovoltaic materials. Such solar collectors are less expensive to produce and easier to install and work with. Also, their efficiencies are making giant steps forward making them more effective on a per area basis. Still, the generation of solar power is not yet cost-competitive (without factoring in environmental costs like pollution) with fossil fuels.

In addition, this approach relies on at least one variable environmental factor (sunshine) which is not always available. For example, at night, when no sunshine is available, solar systems will provide no power, thus potentially interrupting energy flow if relied on too heavily in a grid system. One solution has been to co-locate wind and solar energy collection systems.

The co-locating of solar and wind energy collection systems in a single hybrid power generator has advantages such as fewer interruptions in energy generation. Sun and wind availability are always correlated at a wind turbine's location, yet when both solar and wind systems are working simultaneously greater energy generation per unit area of land and increased peak production per unit area of land occurs. This decreases the overall costs of production and reduces costs associated with maintenance due to economies of scale.

Accordingly, there is a need for a system that generates electrical power from renewable sources and that maximizes energy generation while minimizing interruptions due to environmental factors. There is a need for a system that generates energy from renewable sources at an improved cost per kW.

Currently, most wind-based power systems are idled at various times and during various conditions. For example, many wind turbine power systems cannot operate below a certain wind speed. In other systems, it may not be desirable to operate the wind turbine when wind speeds exceed a certain velocity. Regardless of the reason, ultimately, these idled wind turbines must be restarted.

Most large wind turbine power systems are operatively connected to a power grid system which is routing power from power plants to end users. Today's power plants are predominately fossil fuel based systems. Power for a wind turbine restart is currently taken from the existing power in the grid, meaning wind turbine systems are likely restarted using power originating at a fossil fuel based power plant.

Additionally, relying on grid power for a wind turbine restart means relying on grid infrastructure. Downed power lines, transformer issues and the like can cause disruption not only to the end user but can also prevent a restart of a wind turbine power system that could otherwise provide power to the grid.

When a wind turbine is shut down due to wind speeds or other weather conditions, the wind turbine's blades are turned out of the wind by performing a yaw maneuver. This yaw maneuver protects the internal mechanical workings typically found in the nacelle of the wind turbine. Yet, once the weather has passed and the wind speeds are slowed, the wind turbine blades can be turned back into the wind and the turbine restarts power generation. To turn the wind turbine blades back into the wind, another yaw maneuver is executed. As a matter of practice, the power required to execute this maneuver is pulled from grid power and this maneuver is delayed when grid power is unavailable. That is, the wind turbine cannot execute the yaw maneuver to provide power, if power is already unavailable, thus leaving an already disabled energy provider without the ability to provide power when it is most needed.

One of the advantages of renewable energy is that it usually is available when other power is not. Without the restart of the wind turbine, this advantage is lost to the energy provider/power company and the consumer.

Recently, the solution of adopting a non-renewable energy source was adopted as diesel generators were installed in wind turbines. Yet this "solution" is fraught with challenges including the storage and supply of the diesel fuel plus the need for physical manpower to start the diesel generator. Being man-power intensive presents a set of problems immediately following foul weather when the movement of man and materials is often disabled. Moreover, diesel generators are not a renewable energy source, thus turning the renewable energy solution presented by wind and/or solar power into one still reliant on a dirty fuel start. In addition, the maintenance and fuel management of these diesel generators drains both manpower and financial resources as the generators are maintained and fuel is delivered to and stored at the wind farm. All in all, this solution, although workable, has many flaws.

However, according to the Wind Turbine Systems Engineering Meeting at NREL in 2013, the restart power of a wind turbine has moved to using Diesel generators and away from using grid power to ensure that wind power continues to be produced when grid power is unavailable to restart the turbine.

The use of wind turbines to generate electricity is well known in the prior art. These turbines generally include a vertical tower which supports a turbine operatively connected to a propeller which spins on a horizontal axis or to another device designed to take advantage of the moving wind. Alternative designs and orientations are shown and discussed here.

Known prior art wind turbines with a solar component include systems such as that shown and described in U.S. Pat. No. 6,372,978 entitled Wind/Sun Solar Collection System, which is incorporated in its entirety herein by reference. This system uses separate solar panels and wind turbines requiring a vast footprint. However, many wind turbine "farms" are installed on land which is also put to other uses. For example, many wind turbine farms are located in agricultural areas where farming of the surrounding land is also desired. It is therefore desirable to provide a solar and wind collection system which minimizes its overall footprint and thus the amount of land required for its use.

Similarly, U.S. Pat. No. 6,097,104 entitled Hybrid Energy Recovery System, which is incorporated in its entirety herein by reference, describes a system that collects energy through separate solar and wind generators. Again, the solar panels and separate wind turbine take up a large area. Moreover, only enough solar energy is collected to support some energy needs of the wind turbine, such as emergency backup power, but the system is not large enough and does not produce enough power to execute the required yaw maneuver of today's power generating wind turbine. In addition, this design does not support a solar energy collection capability that is added to the wind turbine power for purposes of a hybrid power generation capability as with the present invention.

Attempts have also been made to provide power generation from two renewable energy sources, but they have major structural differences with the system design disclosed in U.S. Pat. No. 4,551,631 entitled Wind and Solar Electric Generating Plant, which is incorporated in its entirety herein by reference, where the system includes a separate wind generator or turbine which has a roof or other similar structure covering that supports an array of solar cells. The system uses a wind turbine which rotates about a vertical shaft. Such arrangements require a much larger footprint and thus tend to take up too much space for large scale use. Although the platform of solar cells may provide an additional source of energy when the sun is shining, the platform also serves to divert the natural wind flow thereby altering the effectiveness of the wind turbine. In addition, such a system results in additional cost for the construction of the roof platform, as well as added maintenance for the additional structure. Furthermore, many areas of the country, which receive substantial snowfall, are not well suited for utilizing these systems.

Other attempts have been made to include solar panels on the fan blades of a wind turbine as in U.S. Pat. No. 5,254,876 entitled Combined Solar and Wind Powered Generator with Spiral Blades, which is incorporated in its entirety herein by reference, and U.S. Pat. No. 7,045,702 entitled Solar-Paneled Windmill, which is incorporated in its entirety herein by reference. Similarly, in U.S. Publication No. 2008/0047270 A1 entitled Solar Windmill, which is incorporated in its entirety herein by reference, where the solar panels are mounted on the surface of the flaps and fins. The inclusion of the solar panel or cells on the fan blades, fins or flaps limits the solar energy collection area and does not generate enough power to execute the required yaw maneuver. In addition, it does not create an effective way to combine the two renewable energy sources for a hybrid power generation capability. In these designs the solar power does not augment the efficiency of the wind turbine's power generation capability as does the hybrid wind and solar energy collection systems of the present invention.

In U.S. Pat. No. 7,345,374 entitled Decorative Windmill With Solar Panel, which is incorporated in its entirety herein by reference, the solar energy collector is sized and selected to provide for the functional requirements of electrical devices associated with the windmill use or for the decoration of the windmill only. The solar generation capability is not used to be part of a hybrid energy generation system as with the present invention nor does it generate enough power for the required restart power.

In U.S. Pat. No. 8,432,053 entitled Wind Turbine Solar Control System, which is incorporated in its entirety herein by reference, the solar energy system does not provide the power required to execute the yaw maneuver of wind turbine blades. Instead, the solar energy is used to provide power directly to the electric turbines, and no mention of the yaw maneuver or a yaw system is made. A back-up power supply is mentioned for use in restarting the turbine, however, the reference fails to describe how enough energy can be stored in order to provide power to the back-up power supply. The reference mentions the use of a rectangular solar panel without discussing how the single solar panel will provide sufficient energy for the system to restart. It is thus desirable to develop a new and improved wind turbine system which would overcome these difficulties while providing better and more advantageous overall results.

SUMMARY

An exemplary embodiment may provide a wind turbine system that maximizes the use of renewable energy to restart the wind turbine's blades via the required yaw maneuver.

An exemplary embodiment may also provide a wind turbine output augmentation while using renewable energy, specifically thin film solar photovoltaics. An exemplary embodiment may provide a solar power system that is used for reliable restarts.

It is to be understood that both the foregoing general description and the following detailed description are merely exemplary of the invention and are intended to provide an overview or framework for understanding the nature and character of the invention as it is claimed. The accompanying drawings are included to provide a further understanding of the invention and are incorporated in and constitute a part of this specification. The drawings illustrate the invention; and together with the description serve to explain the principles and operation of the invention.

An alternative that stays in the realm of power generation utilizing renewable energy is presented. The use of solar power is a better option than current diesel generators because it does not require someone to physically access the wind turbine to restart it and it does not require the storage and maintenance of fuel at the wind turbine's site; it is a less-expensive (free) way to restart the wind turbine compared to buying the grid power from the energy company or purchasing diesel fuel because it is a RENEWABLE-ENERGY solution which adds value by providing solar output power to augment wind power as output of the wind turbine.

In an embodiment, the solar power generated is the power required to support wind turbine operations, including the power required to execute the yaw maneuver of the wind turbine blades to restart wind power energy generation.

The use of solar power improves the overall efficiency of the power generating system and increases the dependency of the overall power generating system. Upon conversion of the solar energy, not only are restart power functions executable, but ongoing supplemental power generation is achieved. An exemplary hybrid wind turbine employing a solar photovoltaic system increases the maximum energy output of the wind turbine.

The solution presented herein is to use solar power to restart the wind turbine. Accordingly, this solution utilizes solar photovoltaics, creating a hybrid wind turbine design. The solar power produced generates the required power to restart the wind turbine. Solar power is a renewable solution to this problem and is a less dangerous, less man-power intensive, and more reliable solution. Also, the solar power system can be electronically connected so that it is remotely activated and thereby does not require the physical presence of a technician to start a generator. In addition, the power produced by the solar photovoltaics can be added to the wind turbine output thereby achieving a higher overall output in renewable energy production.

An exemplary embodiment may be applicable to wind turbines and will be described in relation to wind turbines; however, the embodiments may have broader applications and may also be adapted for use in other power systems.

In these respects, an exemplary hybrid wind and solar turbine substantially departs from the conventional concepts and designs of the prior art, and in so doing provide an apparatus primarily developed for the purpose of generating the restart power to execute a wind turbine's blade's yaw maneuver as well as augmenting the generated power. An exemplary embodiment may provide a new hybrid wind turbine and solar PV method which has many of the advantages of the turbines and includes new features resulting from a new hybrid wind and solar turbine which is not anticipated, rendered obvious, suggested, or even implied by any of the prior art turbines, either alone or in any combination thereof.

In general, an exemplary embodiment may provide power for the wind turbine yaw maneuver and a more efficient and dependable power generation system utilizing wind and solar power generation and having features allowing the opportunity to harvest two renewable energy types into a hybrid power generation capability. This makes wind turbines more fault-tolerant and increases their dependability as a power source.

An embodiment relates to a solar based power system to restart a wind turbine's power production/generation. This is an environmentally friendly combination of wind turbine and solar energy collectors that restart wind turbines after the blades are stationary.

Certain wind conditions require for the blades of a wind turbine to be stopped. The wind turbine may rotate away from the wind in order to stop the blades. When the conditions no longer exist, the blades need to be rotated back into the wind so that the blades face into the wind and can collect wind energy. Turning the wind turbine's blades is called a yaw maneuver. In an exemplary embodiment, the power required to execute the yaw maneuver is generated from a thin-film solar photovoltaic system secured to a common support structure: the wind turbine's tower.

When power is not required for the yaw maneuver, the same thin-film solar photovoltaic system generates an output that augments the power generation of the wind turbine. The hybrid energy collection system includes the wind turbine and a thin film solar energy collecting system that is adhered to the wind turbine tower. To show the effectiveness of the solar power system's ability to generate the required power to maneuver the wind turbine's blades, an academic analysis is provided.

This hybrid wind turbine's energy output is controlled by a power management program and may be combined with the solar power energy that is generated from solar photovoltaic material through an electrical subsystem associated with the wind energy collection system, an electrical subsystem associated with the solar energy collection system, and/or a combination and control subsystem conductively coupled to both the electrical subsystem associated with the wind turbine and the electrical subsystem associated with the solar energy collection system.

Instead of "starting" the blades, power is needed by the rotational blade assembly to turn the blades into the wind and change the pitch of the blades so that the wind can strike the blades at an optimal angle such that the force of the wind can rotate the blades. While turbines are different based upon manufacturer, when manufactured, most have 690 volt systems and there are typically three 7.5 Kw (or 22.5 kilowatts total) delta motors connected to turn the turbine's blades change the yaw. Therefore, this system may be applied to various types of wind turbines. Technological advances have allowed us to increase the power output generated by a wind turbine by increasing the length of a wind turbine's blades. To support this increase in blade length, the height of a wind turbine tower continues to increase thereby increasing the surface area upon which to attach the thin film solar photovoltaics. In addition, technological advances in thin film solar photovoltaic efficiencies will result in larger augmentations to the hybrid wind turbine's output.

Since 1980, wind turbine towers have gone from 24 meters to 114 meters in height. Using a 60-meter-tall wind turbine tower, the total surface area is calculated to be 258 square meters. Considering the power needed for an exemplary yaw maneuver and using a commercially available thin film solar photovoltaic ribbon of cadmium telluride on amorphous silicon thin film solar photovoltaics, the power needed to support this maneuver can be produced by 144 Watt ribbon. In an embodiment, each ribbon will cover 2.16 square meters of the wind turbine tower. When the available surface area of the wind turbine tower (258 sq. meters) is covered, the solar power produced will be enough to support the yaw maneuver of the wind turbine blades. Thus, an output of more than 50 kilowatts will be realized. The wind turbine yaw maneuver requires only 17 kilowatts.

Through the addition of solar PV to a wind turbine that is the hybrid renewable energy wind and solar turbine an exemplary embodiment there is a decrease in wind power production intermittency with an increase in the power generation capability. An exemplary embodiment uniquely utilizes the wind turbine tower surface area to increase the wind turbine's power generation capability. To attain this, an embodiment generally comprises a hollow tower with an outer shell constructed to support solar cells as well as to provide a support tower for the wind turbine. The surface area of the cone-like structure of most wind power generation turbines provide a large surface for the placement of solar PV. Integrating PV materials into the wind turbine support structure may increase the wind generator's power generation capability and an enhancement of the wind generator's dependability.

Although some of the prior art provides a source of wind and solar power generators in one location, none of the prior art references a system including solar photovoltaic material on the turbine tower body. By placing the solar photovoltaic material on the tower or body of the wind turbine, there is no increase in the footprint, whether the wind turbine is located on land or on water.

On the wind turbine tower with the placement of the solar PV material in a partially vertical axis, there is a reduced risk of being covered in snow or debris due to this vertical placement, thereby reducing maintenance. In addition, the vertical placement along the body of the tower ensures that the natural wind flow is not diverted and therefore has little or no interference with wind dynamics or the effectiveness of the wind turbine. An embodiment may solve the problem caused when the turbine is not active, when the potential for power outage is greatest. It also provides a workable solution for a large portion of that time and has the advantage of augmenting the power production capability when the wind turbine is not active. As solar energy use has become more popular as an environmentally non-invasive form of power generation. Users of this technology save money while gaining a dependable power source.

The Return on Investment (ROI) of wind turbine power generation capabilities can be reduced as the power generation potential is increased by an exemplary embodiment. This increase in efficiency makes hybrid wind turbines more cost effective than any prior art. For example, on a wind farm, this hybrid wind and solar power generation capability exceeds the power generation capability of the wind turbines while keeping the landscape or seascape footprint the same. Hybrid systems employing solar and wind power preferably will incur no or little energy costs and once installed, will be comparatively easy and inexpensive to maintain.

An exemplary embodiment relates to a solar photovoltaic power generation capability to augment a wind power generation capability. The problem the invention solves is that of when the wind does not blow, a wind turbine produces no power. The solution of the present invention is to use another renewable energy capability for power generation in the absence of wind and the present invention uses solar energy. The use of solar energy as a source of energy is well known within the art. The present invention was conceived to solve the problem so that when the sun is shining, even if the wind is not blowing, power can be produced.

The present invention can be used on any wind power generation capability supported by a self-supported tower. The invention is made by adding Solar PV to the outside of the wind turbine tower, electrically wiring it to the inside where power collection takes place as the wind turbine generated power is combined for a total power output generation capability. This capability is based on two main criteria: the efficiency by which the photovoltaic material converts sun energy to electrical energy and the size of the solar array.

The dependability of wind power generation is enhanced by partially addressing the concern of the loss of a power generation capability when the wind does not blow. When the wind is not blowing, solar energy is collected during the daytime via photovoltaic material or solar panels electrically connected to the output of the wind turbine. This invention makes wind power generation a more dependable energy source for renewable power generation.

The present invention is used to produce power during the daylight hours and when the wind blows. The solar PV will produce electrical power during daylight hours. If the wind is blowing, the wind turbine will produce electrical power and the power produced by the Solar PV will add to the power production capability of the wind turbine. If the wind is not blowing, the Solar PV will ensure that the wind turbine continues to have a power production capability by both providing usable power as well as by providing power needed to restart the wind turbine, thereby reducing outages.

In an embodiment of the present invention, the use of power plastic solar photovoltaic material can be placed on the portion of the tower, which receives direct sunlight. This embodiment is presented for ease of construction as the solar PV material is lighter in weight and less rigid and is less costly. This embodiment will reduce the upfront cost of the hybrid capability while having the flexibility of this solar PV material.

The placement of the solar PV in one embodiment of the present invention includes the use of thin film solar photovoltaic material which may reduce the cost of the PV material and the upfront costs of the hybrid capability. Thin film solar photovoltaic having a good solar efficiency in shaded areas can be placed on the portion of the wind turbine tower where there is relatively little direct sunlight. By adding thin film solar PV to the shaded portion of the wind turbine tower, an increase in the solar energy production capability will be realized.

An exemplary embodiment has a wide range of uses from large commercial wind generation capabilities to the small wind power generators. In addition, an embodiment could be used for wind turbine towers located on land or on water. It is anticipated that the water-based hybrid wind turbine would produce more power than the land-based hybrid wind turbine due to the light reflective qualities of the water which would increase the solar photovoltaic system's power production capability.

Further advantages will become apparent from a consideration of the drawings and ensuing description. An embodiment provides renewable energy to the motor of a wind turbine's blade control system. The start-up of the blades allows the wind turbine to operate more continuously, generating more energy. This solar power system may be applied to various types of wind turbines whose blades that are run on an electric motor.

The system would use sun and wind power to more efficiently generate electricity. The system could be set up so that each wind turbine has a dedicated solar power system and control system.

However, the system could be designed to share certain elements or to share an array of elements. For example, a wind farm comprising a group of wind turbines could utilize the power of a different wind turbine's solar restart system.

BRIEF DESCRIPTION OF THE DRAWINGS

Features and aspects of the present invention will be better understood and will become apparent when consideration is given to the detailed description that follows with reference to the drawing, wherein.

DETAILED DESCRIPTION

The present invention will be described as it applies to its preferred embodiment. It is not intended that the present invention be limited to the described embodiment. It is intended that the invention cover all modifications and alternatives which may be included within the spirit and scope of the invention.

The energy system according to an exemplary embodiment includes a solar energy system and a wind energy system where the solar energy system is used to generate the power required to execute a yaw maneuver to restart wind power generation. When not required to restart the wind turbine, the solar energy production augments the wind turbine power output creating a hybrid energy output which is managed by the combination system. The operation can be monitored with user-controlled software, referred to herein as a control system. In operation, the control system controls and coordinates the solar energy system, the wind energy system and the combination system.

Figure 1:
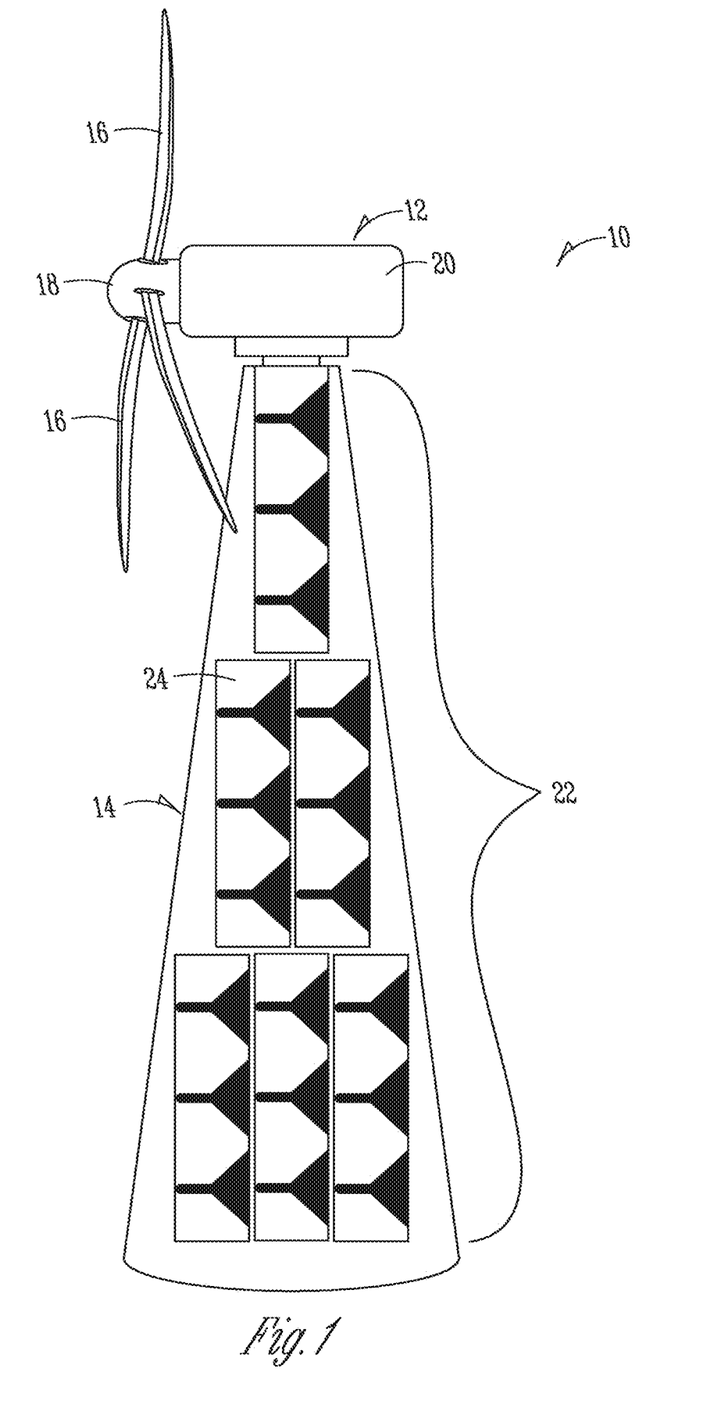
FIG. 1 is a first embodiment of a wind turbine's tower with the addition of solar photovoltaic cells.

Referring now to FIG. 1 in the drawings, an exemplary embodiment of a hybrid wind turbine and solar photovoltaic system 10 is illustrated. Hybrid wind turbine and solar photovoltaic system 10 may include a tower or frame 14, a wind energy system 12, and a solar photovoltaic assembly 22.

Figure 2:
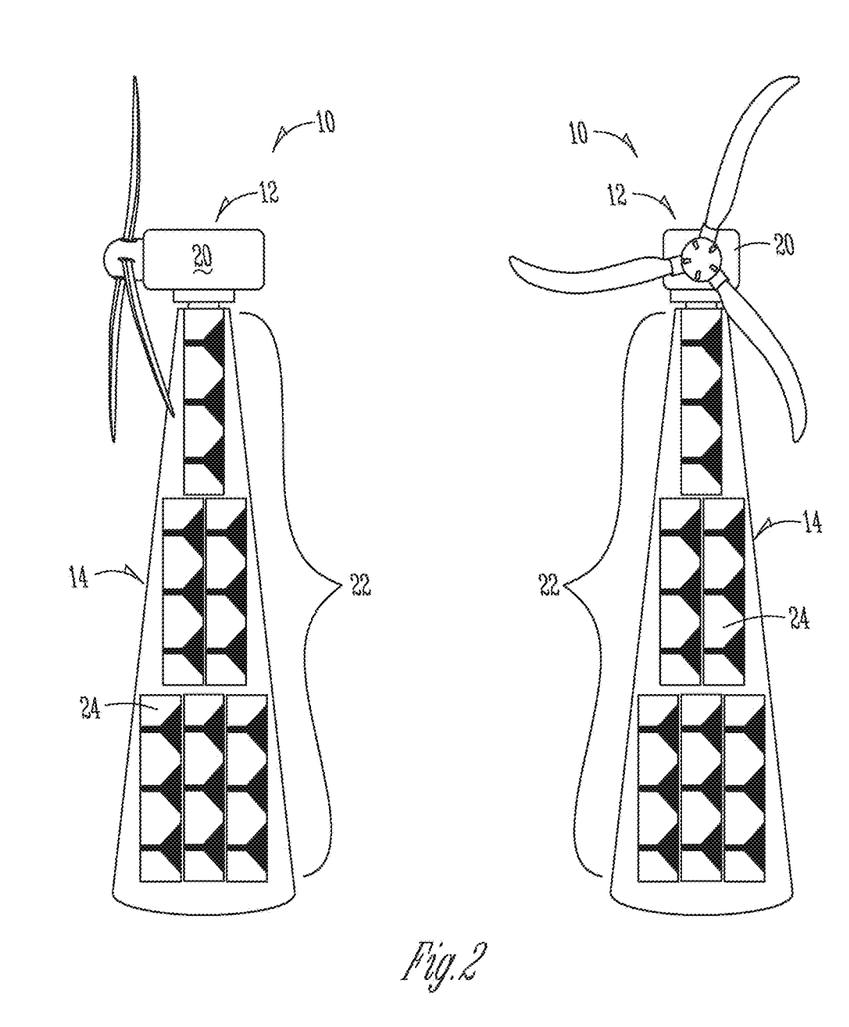
FIG. 2 illustrates an exemplary embodiment of two wind turbines in different positions on their respective wind turbine towers to show an example of the yaw maneuver.

Referring now to FIG. 2, an exemplary embodiment of the hybrid wind turbine and solar photovoltaic system 10 is illustrated beside the same embodiment with the wind turbine's blades in the yawed position. Shown are the tower 14, the wind energy system 12, and the solar photovoltaic assembly 22.

Figure 3:
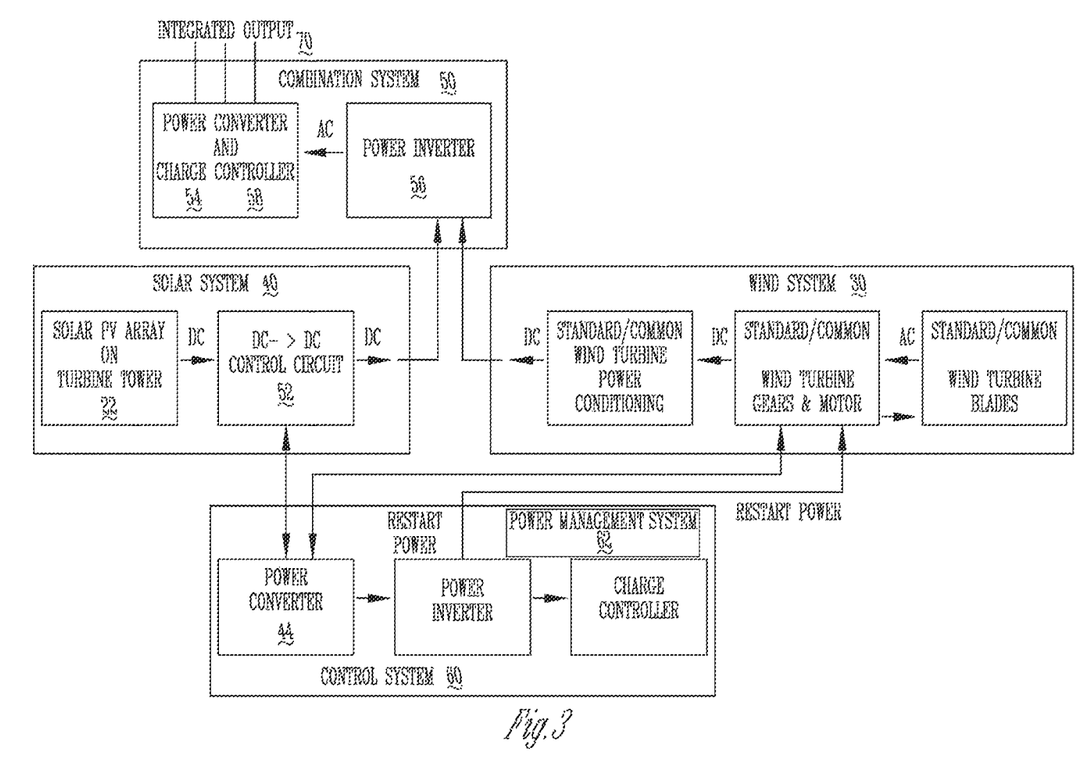
FIG. 3 is a block diagram of the electrical circuit of the solar power energy flow to the rotational blade electrical circuit assemble to support the wind turbine's restart and also details the combined wind power and solar power output.
Figure 9:
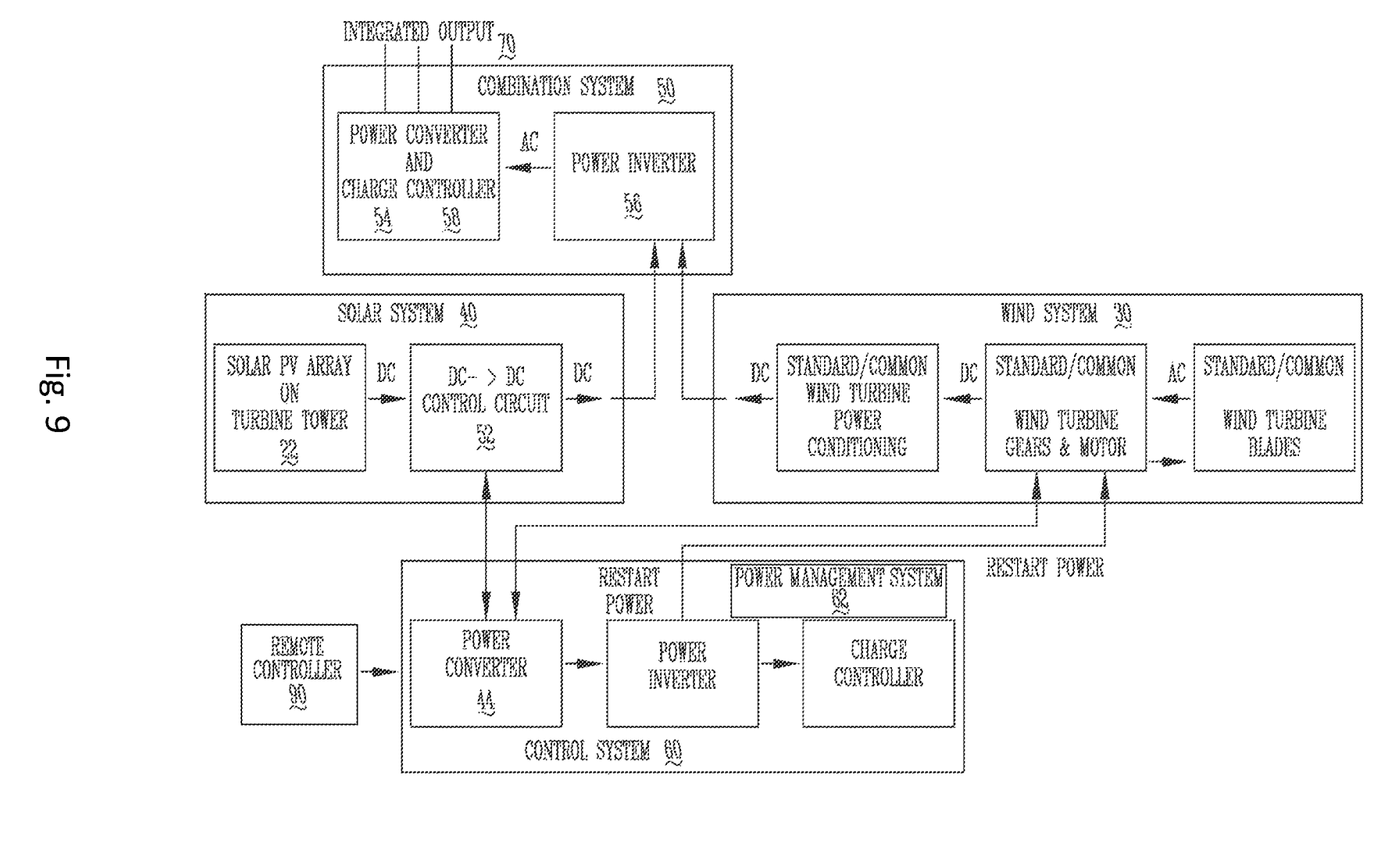
FIG. 9 illustrates a block diagram of an electrical circuit with a remote controller.

Referring to FIG. 3, an exemplary electrical system block diagram is illustrated. The major structural parts of the hybrid wind turbine and solar photovoltaic system 10 of FIG. 1 are: the wind energy system 12; the wind turbine tower 14 and the solar photovoltaic assembly 22, along with the wind electrical system 30; the solar electrical system 40; the combination system 50, and the control system 60. The solar photovoltaic and the wind turbine generated power are fed to the Power Converter 44 of the Control System 60 located inside of the wind turbine tower 14, as shown in FIG. 1, where the output is fed back to the wind turbine's yaw maneuver systems in the nacelle 20 when needed or are combined into a single output power by the combination system 50, as shown in FIG. 3, which is inside the wind turbine tower 14. The wind turbine gears and motor, illustrated within wind electrical system 30 are used to execute the yaw maneuver. The yaw system may include the wind turbine gears and motor as well as appropriate sensors for measuring weather conditions and wind speed. (As further shown in FIG. 9, the system can be electronically connected so that it is remotely activated by remote controller 90 and thereby does not require the physical presence of a technician to start a generator.)

Figure 6:
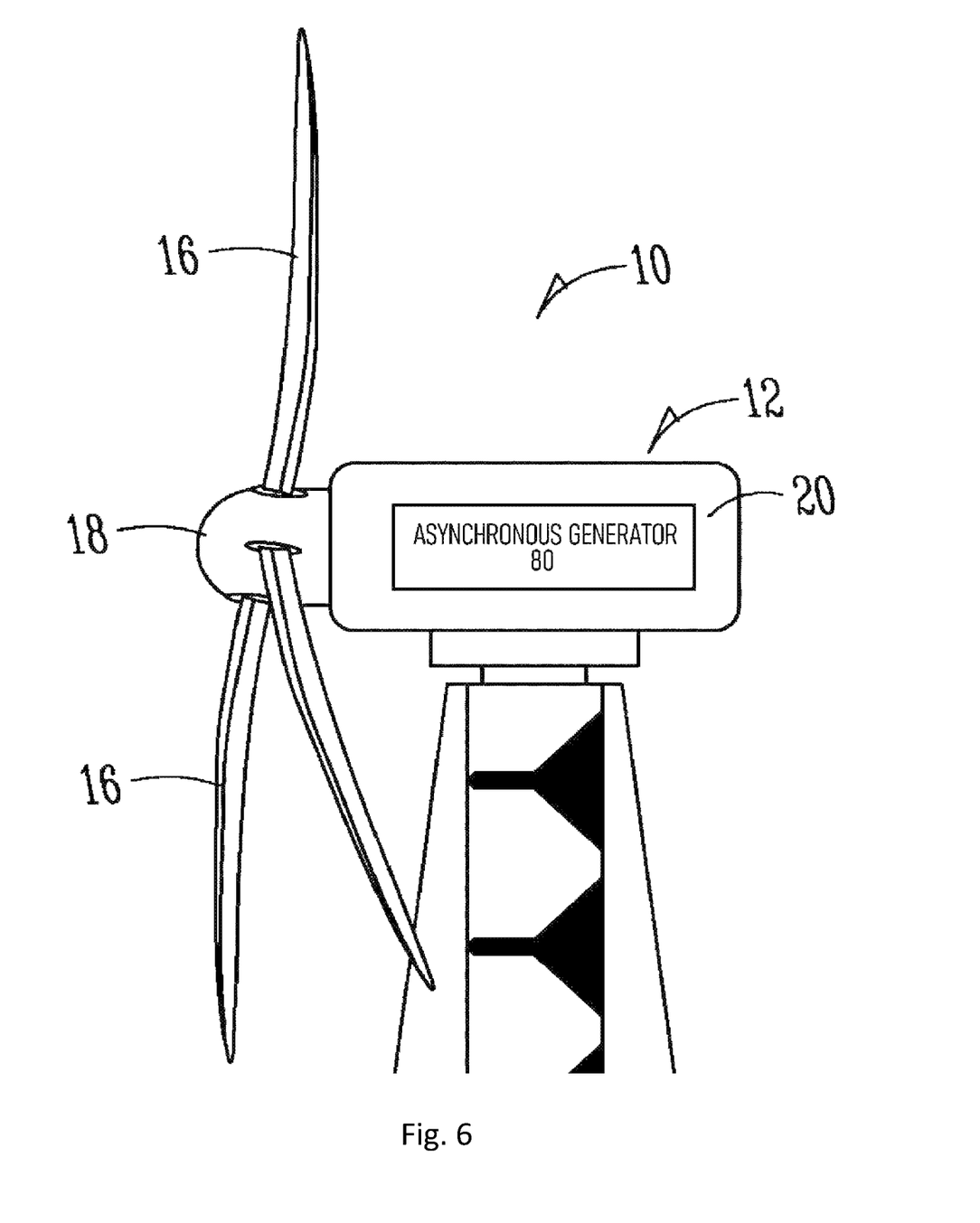
FIG. 6 illustrates an exemplary embodiment of a hybrid wind turbine and solar photovoltaic system with a non-synchronous power generating capability.
Figure 7:
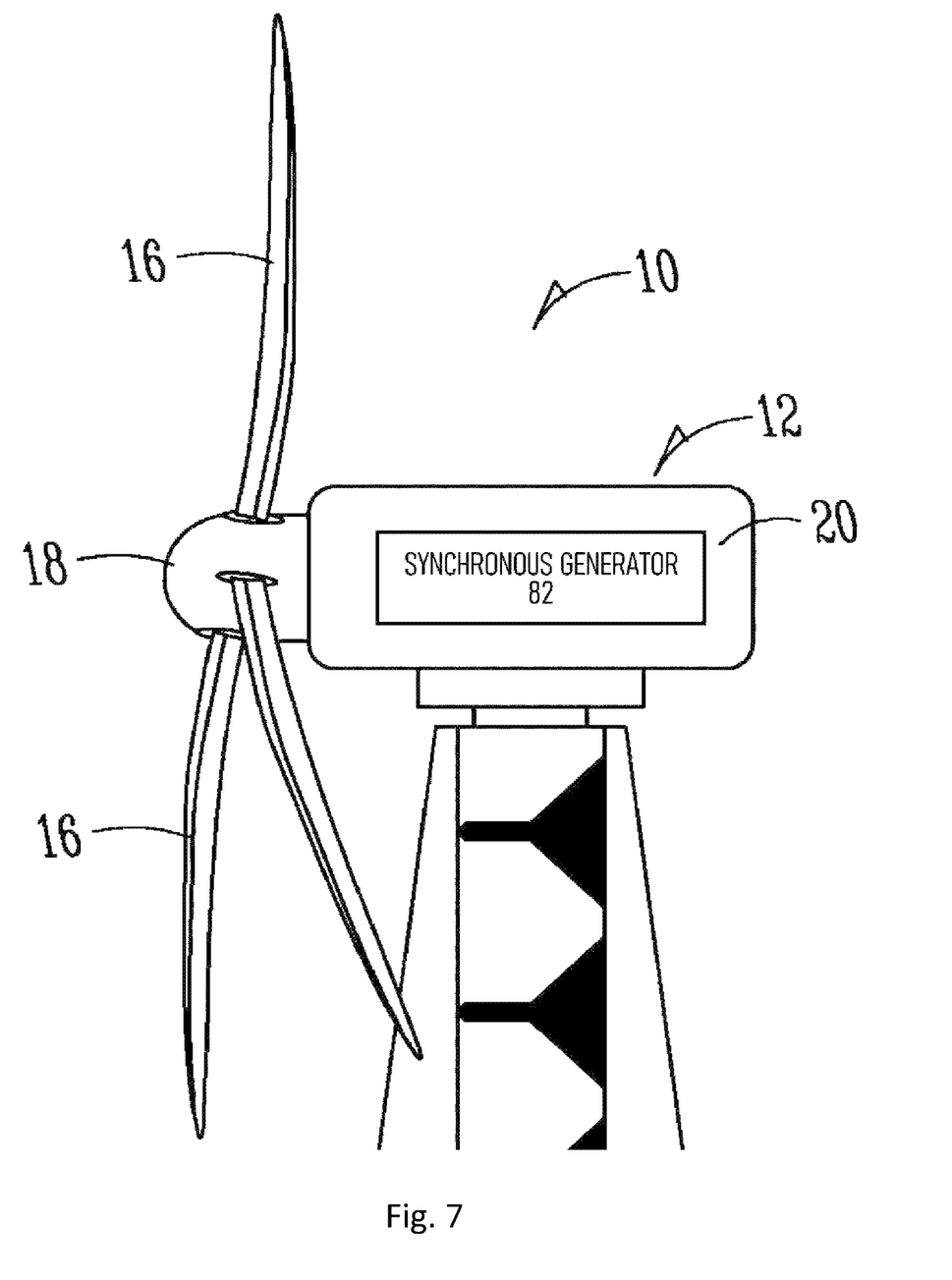
FIG. 7 illustrates an exemplary embodiment of a hybrid wind turbine and solar photovoltaic system with a synchronous power generating capability.

The wind energy system 12, as shown in FIG. 1, may include a wind energy collection system, a control system, and a wind energy conversion system. In addition, the wind energy system 12 may include a synchronous power generating capability (as in grid tied systems) or non-synchronous power generating capability (as in stand-alone systems). FIG. 6 shows an example of an asynchronous generator 80 providing a non-synchronous power generating capability and FIG. 7 shows an example of a synchronous generator 82 providing a synchronous power generating capability. The wind energy system 12, as shown in FIGS. 1 and 2, may include a tower 14, and a wind turbine assembly 16, 18, 20. The tower 14 may be a solid structure or a lattice frame structure made up of legs and cross members. The wind assembly 16, 18, 20 may be attached to the top of the tower 14 with a rotational blade assembly 16 attached to a swivel bracket with a wind vane rigidly attached to the other end of the swivel bracket to keep the rotational blade assembly 16 always properly facing into the wind when collecting wind energy. The rotational blade assembly 16 is secured to a generally horizontal axle 18 which is operatively connected to a generator disposed in the nacelle 20. A transmission may be included if desired between the axle 18 and the generator disposed in the nacelle 20. The tower 14 may be constructed of metal, but may be constructed of plastic, wood or any other suitable material as desired.

As shown in FIG. 3, the hybrid energy system may include a combination system 50, a control system 60, and a power output system. This combination process includes power converters 54, inverters 56, and charge controllers 58, which are considered standard with typical wind turbine power production and solar PV power production capabilities. However, an exemplary embodiment may combine a network to add these two power generation capabilities outputs together to one hybrid, yet integrated power source.

As also shown in FIG. 3, the solar electrical system 40 may include a solar photovoltaic assembly 22, a control system, and a solar energy conversion system. The solar photovoltaic assembly 22 is formed from solar photovoltaic material 24, such as solar photovoltaic collectors or cells, and other necessary circuitry for receiving and collecting solar energy (which may be a solar control system 52 such as a DC→DC control circuit as shown in FIG. 3) and converting the solar energy into electrical energy. The solar electrical system 40 is preferably conductively coupled with electrical conductors to the control system 60 that directs the generated energy.

In operation, the solar photovoltaic assembly 22 converts solar energy into electrical energy. The solar electrical system 40 may convert solar energy into electrical energy and deliver the generated electrical energy to the control system 60, or one or more electrical systems, or a rechargeable electrical power source.

The solar control system 52 may include circuitry, microprocessors, memory devices, sensors, switches, and other electronic components necessary to partially or fully direct electrical energy from the solar photovoltaic assembly 22 to the control system or to the combination system or to other control systems where the electrical energy is needed, or to a rechargeable electrical power source.

As shown in FIGS. 1 and 2, the solar photovoltaic material 24 may be located on any suitable wind turbine tower surface. In an exemplary embodiment, the solar photovoltaic material 24 may be positioned such that it is optimally exposed to solar light. In alternative embodiments, a variety of solar photovoltaic materials may be used and arranged to optimize the solar energy collection capability.

Adverse weather conditions can damage a wind turbine. For example, high wind speeds may strain components of the turbine, such as the rotor. In order to prevent damage, wind turbines may include large motors which allow the turbine to pivot away from the wind. The system by which the wind turbine pivots or turns away from the wind is known as the yaw system, which executes the yaw maneuver. By pivoting away from the wind, the blades of the turbine are no longer in the stream of wind and will not spin, thus avoiding damage. Once the adverse weather condition is over, the blades must be repositioned back into the wind so that they may begin spinning again.

In an exemplary embodiment, the collected solar energy may be reserved for activating and deactivating the wind turbine. Activating the wind turbine may require a yaw maneuver, a process which requires a significant amount of energy. As previously discussed, the yaw maneuver is the process by which the blades of a deactivated wind turbine are turned into the stream of wind so that the turbine may begin spinning. Although many types of yaw systems may be implemented in an exemplary wind turbine, the implemented system will still require energy to perform the maneuver. It may be contemplated that the solar subsystem that powers the yaw system also powers any other components needed to start the wind turbine, such as control systems and the like.

Figure 8:
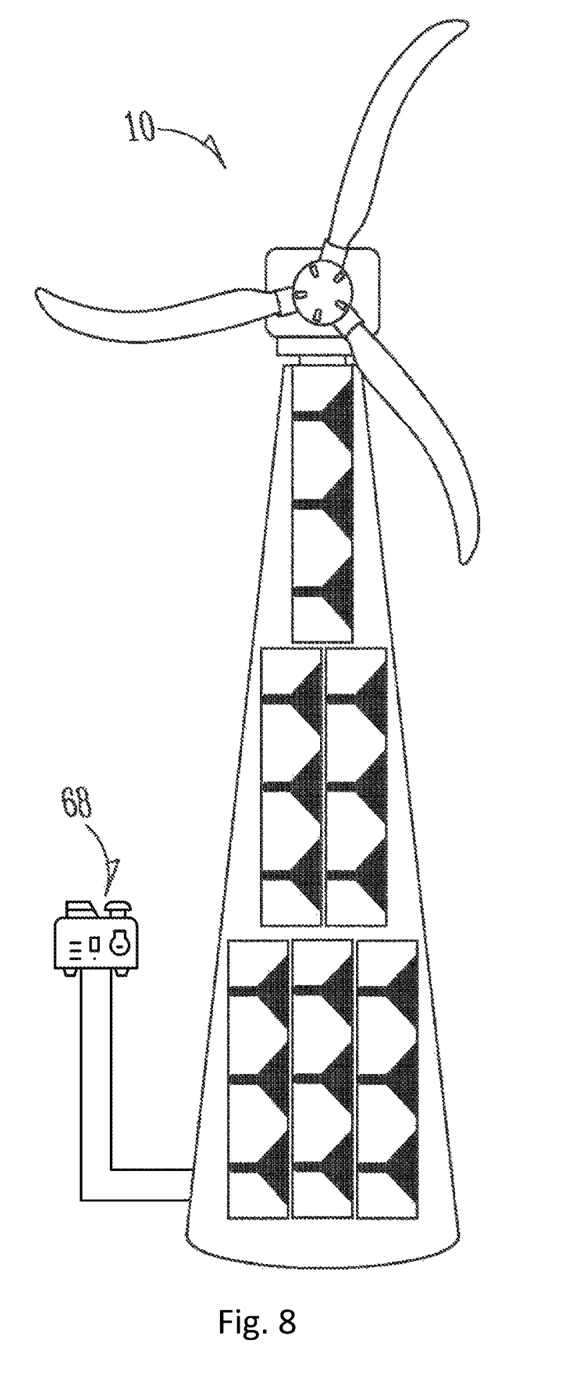
FIG. 8 illustrates an exemplary embodiment of a hybrid wind turbine and solar photovoltaic system with a nonrenewable generator.

Further, if blades have been deactivated for a period of time, such as due to severe and persisting weather conditions, it may be contemplated that the power stored from the wind energy system 12 has been depleted. In such a situation an outside source of energy is required to operate the motors needed for repositioning the turbines to reactivate them (the yaw system). When grid power is not available, diesel generators have typically been used in order to provide the required power. (An example connection to a nonrenewable generator 68 is shown in FIG. 8.) This process requires a technician to be physically present at the location of the turbine in order to connect and activate the diesel generator (which may be difficult or impossible in some cases, such as due to weather conditions). The use of diesel generators undermines the goal of wind power, which is a renewable, clean energy source as opposed to a harmful fossil fuel.

Figure 4:
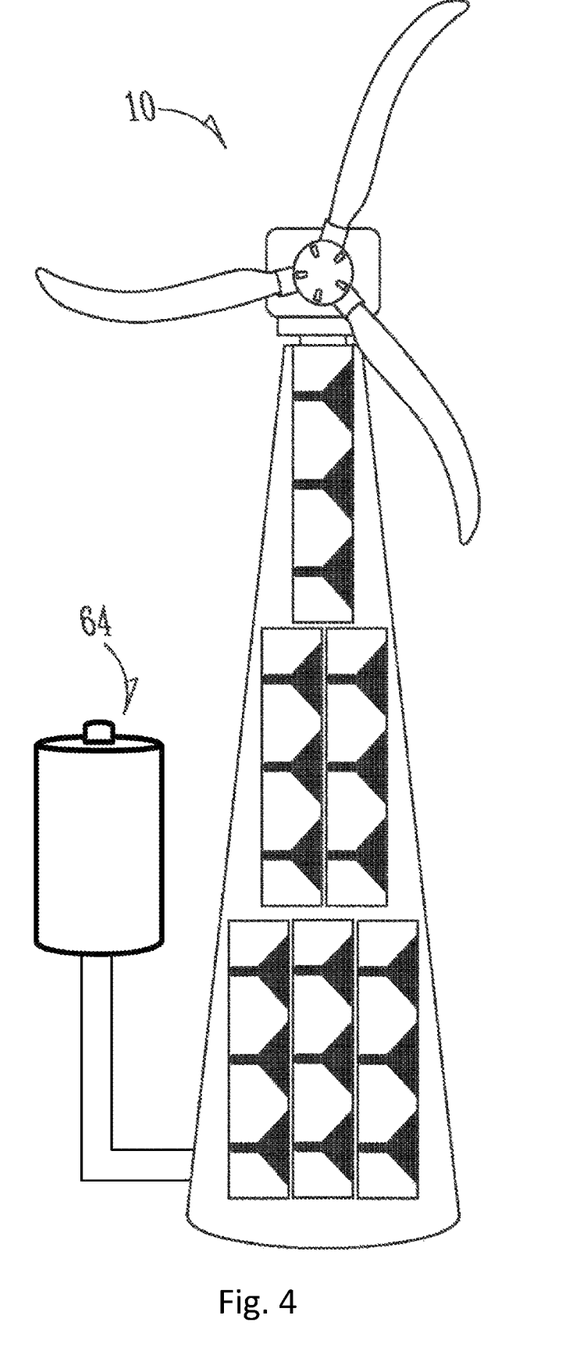
FIG. 4 illustrates an exemplary embodiment of a hybrid wind turbine and solar photovoltaic system with a secondary energy system.
Figure 5:
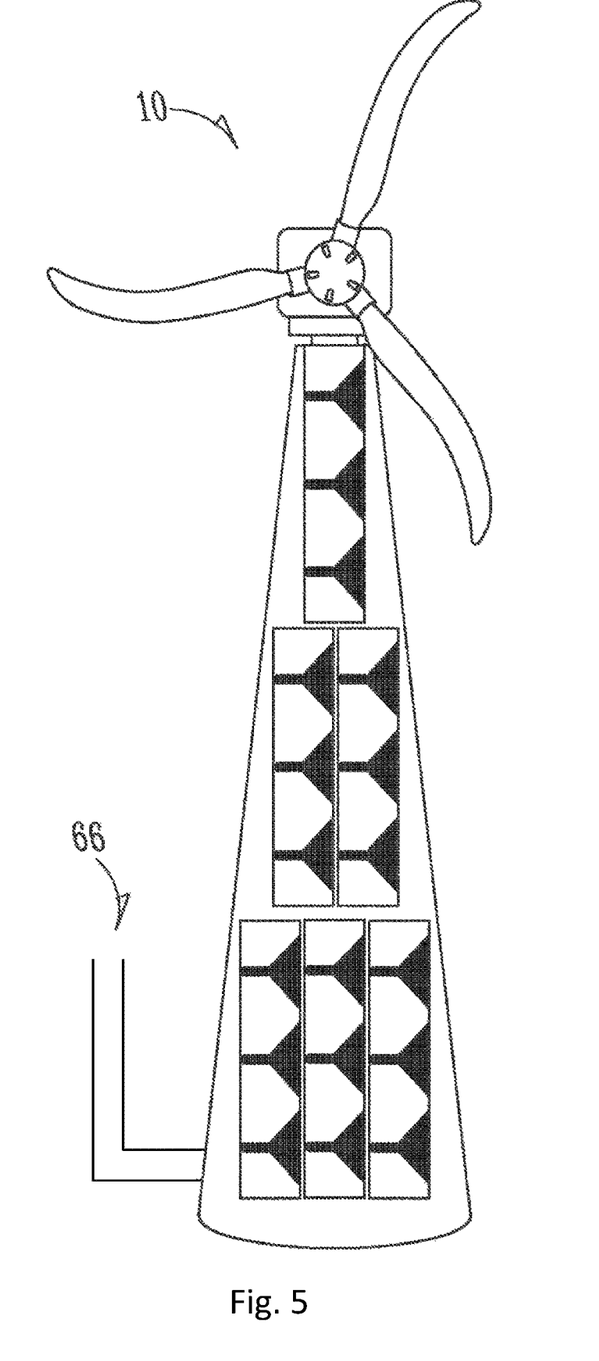
FIG. 5 illustrates an exemplary embodiment of a hybrid wind turbine and solar photovoltaic system with a grid connection.

Thus, an exemplary embodiment solves the problem of how to restart inactive and depleted wind turbine systems by implementing solar cells which reserve energy for the activation of the wind turbine. The yaw system may receive power from a solar subsystem. The solar subsystem may include a secondary energy storage system (such as secondary energy storage system 64 shown in FIG. 4) which receives energy from the solar cells. It may be contemplated that the secondary energy storage system can only power the blade positioning motor and relevant control units and cannot send energy to the grid or other units. By reserving the energy of the secondary energy storage system, an exemplary embodiment ensures that there is always sufficient energy to restart the turbine via the yaw maneuver, although it may be contemplated that the solar subsystem may provide energy to another output once the secondary energy storage system reaches full capacity. Thus, an exemplary embodiment need not rely on grid power (such as via a grid connection 66 as shown in FIG. 5) or non-renewable sources (such as shown in FIG. 8) for restarting the turbine.

In an exemplary embodiment, the secondary energy storage system may be omitted. Instead, the control system may reserve energy from the solar subsystem for the yaw maneuver. It may be further contemplated that the solar subsystem may directly provide power to the yaw system.

The wind turbine industry utilizes blade repositioning in adverse weather conditions in order to avoid or mitigate damage to the wind turbine. However, once the adverse weather conditions are over, the wind turbine industry utilizes gas- and diesel-powered motors in order to execute the yaw maneuver to reposition the wind turbine blades. Thus, in known applications, non-renewable energy is relied upon to effectively restart wind turbines in order to generate renewable energy. This leads to a variety of problems.

First, the gas or diesel motors must be adequately fueled and/or refueled. As a result of adverse weather conditions, this task can become difficult or impossible as supply lines may be negatively impacted, land-based locations may be inaccessible, or, for sea-based wind turbines, the time needed to reach and access such motors may be significant, resulting in correspondingly long down times for the wind turbines. Similarly, if the motors fail or need maintenance, the necessary workers would not be able to access the motors to provide the necessary service or repairs in these situations.

Moreover, there is a problem with the reliance of non-renewable energy in order to make a renewable energy source, such as the wind turbines in the present application, functional. Such prior art implementations do not properly allow for a shift to completely functional and renewable energy sources, such as those presently claimed.

Also, the nature of the prior art motors is that they require maintenance and upkeep. Thus, additional time and energy must be spent in order to ensure even routine functionality of these motors.

The problems described above are further not mitigated by the use of traditional solar panels, such as crystalline silicon solar panels, mounted on a traditional wind turbine. Although such uses have been envisioned, traditional solar panels must be mounted using supports and cannot be molded or otherwise formed and fastened to a wind turbine such that the desirable and functional aspects of a wind turbine structure can be maintained. Further, traditional solar panels suffer from significant failure rates due to varied weather and sun conditions.

An exemplary embodiment may include a hollow support tower with an outer shell constructed to support solar cells as well as to provide a support structure for the wind energy system 12. The surface area of the cone-like structure of most wind power generation turbines provide a large surface for the placement of solar photovoltaics (PV). Integrating PV materials into the wind turbine support structure may increase the wind generator's power generation capability and dependability. The thin film solar photovoltaic material can be molded and secured to the wind turbine structure so as to preserve the desired and functional shape of the wind energy system 12. Further, as few supports and fastening elements are necessary for the thin film solar photovoltaic material, there are fewer problems associated with structural failures as seen in traditional solar panels. Additionally, the thin film solar photovoltaic material utilized has increased strength and durability when compared with traditional solar panels. The thin film solar photovoltaic material can thus be used in various locations where adverse weather conditions are often known to exist and significantly outperform traditional solar panels in terms of maintenance requirements and failure rates. It may be contemplated that the thin film solar photovoltaic material may be replaced with another alternative flexible photovoltaic material.

In an exemplary embodiment, the solar cells may be arranged along the vertical support structure of the wind energy system 12. In an embodiment, the solar cells may be repositionable around the structure and may cover a large portion of the structure. The cells may be, for example, amorphous thin-film solar photovoltaic ribbon of calcium-telleride. By fixing the solar cells to the support tower, the solar system does not require any additional structures or surface area as compared to traditional wind turbines. While other wind turbines may include horizontal surfaces, which hold the solar cells, an exemplary embodiment only holds solar cells on the vertical support so as to not interfere with the aerodynamic performance of the turbines and to not block large portions of incoming sunlight. However, it may be contemplated that a support structure for the solar cells is located away from the vertical support structure in a position or angle which directs winds towards the blades such that the wind generation capability is augmented.

On the wind turbine tower 14 with the placement of the solar PV material in a partially vertical axis, there is a reduced risk of being covered in snow or debris due to this vertical placement, thereby reducing maintenance. In addition, the vertical placement along the body of the tower ensures that the natural wind flow is not diverted and therefore has little or no interference with wind dynamics or the effectiveness of the wind energy system 12. An embodiment may solve the problem caused when the turbine is not active, when the potential for power outage is greatest. It also provides a workable solution for a large portion of that time and has the advantage of augmenting the power production capability when the wind energy system 12 is not active. Solar energy use has become more popular as an environmentally non-invasive form of power generation. Users of this technology save money while gaining a dependable power source.

In an embodiment, when the rechargeable electrical power source is fully charged, the solar photovoltaic assembly 22 may deliver electrical energy to the combination system 50 where the electrical energy is combined with the wind energy produced by the wind energy system 12 and then delivered to the grid as output power (for example via a grid connection 66 such as is shown in FIG. 5). For example, the electrical energy is first directed to power electrical systems to execute the yaw maneuver via the control system 60 or it could be directed to the combination system 50 to produce an output when wind energy production is not possible.

The control system 60 is integrated with the solar electrical system 40, the wind electrical system 30 and the combination system 50 and the control system 60 to control each system's output and monitor each system's input. For example, when an input of electrical energy is sensed from any system, the input is measured. The measured input is then compared to the desired output. If the measured input exceeds the desired output to an intended source, modifications to the system are made. For instance, should both the solar and wind generators operate at maximum capacity (a power output maximum condition), the power output 70 may likely exceed the allowable output to an electrical grid. In such situations, the control system will instruct the wind energy system 12, shown in FIG. 1, which operates on top of the tower 14 to rotate about the tower's 14 vertical axis executing a yaw maneuver and turning the blades out of the wind. Such rotation is accomplished by a positioning motor as is well known in the art. In this manner the wind energy system 12 is no longer facing directly into the wind, but rather is being rotated by only a component of the wind's velocity. Such yawing of the wind energy system 12 will reduce the power output to meet the requirements of the power management program 62 of the control system.

In addition, should the power management program 62 sense there is no wind at the present time, the wind electrical system 30 can be shut down to conserve power. Similarly, should the power management program 62 in the control system detect an input from a photo sensor that it is no longer sunny, the power management program 62 will shut down the solar electrical system 40, shown in FIG. 3. Finally, the power management program 62 in the control system can also control the distribution of any power generated to ensure all subsystems of the hybrid wind turbine and solar photovoltaic system 10 (including subsystems of the wind energy system 12 and the solar photovoltaic assembly 22) operate within limits as desired.

Electrical power systems may be located within the hollow center of the body of the tower 14, shown in FIG. 1, which will also protect them from adverse weather conditions. These systems, shown in FIG. 3, include the control system 60, a wind electrical system 30, a solar electrical system 40, and a combination system 50, plus a power output 70 including a switch.

An exemplary embodiment is a vast improvement to the dependability of wind turbine power production as it substantially reduces power outages caused when the wind does not blow. The efficiency of the wind power generation capability is increased as well. Further, power produced by the solar photovoltaic material 24 on the tower 14 of the wind energy system 12 may be used to restart the wind energy system 12 via a yaw maneuver, and the solar photovoltaic assembly 22 of the hybrid wind turbine and solar photovoltaic system 10 may, as shown in FIG. 1, further have the ability to combine with the output energy of the wind energy system 12 to produce a hybrid power output solution.

FIG. 2 shows two hybrid wind turbine and solar photovoltaic systems 10 with two potential orientations of the wind turbine blades 16. The orientation of the solar photovoltaic material 24 is shown in one orientation although the orientation possibilities are many, only one is shown here yet this does not exclude other orientation possibilities. The solar photovoltaic material 24 in FIG. 1 can be flexible photovoltaics such as thin film or power plastic or can be integrated into the building material of the solid body tower 14 (shown in FIGS. 1 and 2) or to the structural elements or members of a lattice tower. The solar photovoltaic material 24 can be structures added to the outside of the solid or lattice tower 14. The solar photovoltaic material 24 are electrically coupled to the solar electrical system through small openings in the tower structure. The solar photovoltaic material 24 is preferably placed to fully encircle the tower's 14 surface area or placed to efficiently maximize solar energy capture. As described in the embodiments, various types of solar photovoltaic material 24 may be combined.

In FIG. 1, all electrical coupling takes place inside the tower 14 such as the control system 60 as shown in FIG. 3 as well as the wind electrical system 30, the solar electrical system 40 and the combination system 50. The electrical power systems for the hybrid wind turbine and solar photovoltaic system 10 as shown in FIGS. 1 and 2 would preferably be housed to protect against weather and located in the center of the solid body of the wind turbine tower 14. The hybrid wind turbine and solar photovoltaic system 10 shown in FIG. 1 preferably comprises a solid, but generally hollow tower 14 generally constructed of reinforced cement or other suitable material.

The present invention has been described so as to be understood by one of skill in the art who is able to understand that minor variations to the present invention may be done without diverging from the spirit and scope of the invention, which is to be limited only by the claims appended hereto.

What is claimed is:

1. A solar and wind energy collection system, wherein solar power is gathered to perform the task of restarting a wind turbine, the system comprising:
    a wind turbine assembly, the wind turbine assembly including a plurality of wind turbine blades fixed to a vertical support structure;
    a solar energy collecting system including an amorphous thin film solar photovoltaic material secured to the support structure and electrically connected to a secondary energy storage system;
    a yaw system, the yaw system comprising a wind turbine blade positioning motor and a wind turbine blade positioning control system which detects weather conditions and controls the positioning motor, wherein the secondary energy storage system is configured to only output energy to the yaw system;
    wherein the secondary energy storage system is reserved for the wind turbine blade positioning motor and the wind turbine blade positioning control system, wherein the wind turbine blade positioning control system of the yaw system detects adverse weather conditions and activates the wind turbine blade positioning motor in order to rotate the blades according to the weather conditions,
    wherein the wind turbine blade positioning control system of the yaw system, when the plurality of blades of the wind turbine assembly are positioned in a direction not aligned with the wind, is configured to detect that adverse weather is not present and that wind speeds are within safe operating conditions; and
    wherein the wind turbine blade positioning control system is configured to control the wind turbine blade positioning motor to move the plurality of wind turbine blades from a position wherein the blades are not aligned with the wind to a position wherein the blades are aligned with the wind by performing a yaw maneuver, in response to a detection, by the solar and wind energy collection system that adverse weather is not present and that wind speeds are within safe operating conditions in order to restart the wind turbine, and wherein power for operating the blade positioning motor in the yaw maneuver is drawn only from energy stored in the secondary energy storage system derived from the solar photovoltaic material secured on the support structure and without power drawn from another source.

2. The solar and wind energy collection system of claim 1 wherein the wind turbine system is operatively connected to an energy grid.

3. The solar and wind energy collection system according to claim 1 further comprising an electrical subsystem associated with the solar energy collection system supplying an input to a combination subsystem which is conductively coupled to both an electrical subsystem associated with the wind turbine and the electrical subsystem associated with the solar energy collection system and which is housed within the support structure.

4. The solar and wind energy collection system according to claim 1 wherein the thin film solar photovoltaic material secured to the support structure fully encircles at least a portion of the support structure.

5. The solar and wind energy collection system according to claim 1 wherein the wind turbine includes a synchronous power generating capability.

6. The solar and wind energy collection system according to claim 1 wherein the wind turbine includes a non-synchronous power generating capability.

7. The solar and wind energy collection system according to claim 1 wherein the support structure includes a lattice frame.

8. The solar and wind energy collection system according to claim 1 wherein the support structure includes a solid surface and has a hollow cavity defined therein.

9. The wind turbine and solar photovoltaic system according to claim 1 further including a power management program.

10. The solar and wind energy collection system according to claim 1, wherein the wind turbine blade positioning control system is electrically connected to the solar energy collection system and to a remote control system, such that the wind turbine blade positioning control system is configured to, based on remote activation, power the wind turbine blade positioning motor using the solar energy collection system.

11. The solar and wind energy collection system according to claim 1, wherein the thin film solar photovoltaic material is cadmium telluride.

12. A method of restarting a wind turbine, the method comprising:
    detecting, on a wind turbine having blades turned in a direction not aligned with the wind, that adverse weather is not present and that wind speeds are within safe operating conditions;
    collecting energy from a solar energy collecting system located on a wind turbine support structure, said solar energy collecting system electrically connected to a secondary energy storage system;
    transferring the energy in the secondary energy storage system that is electrically connected to the solar energy collecting system to a yaw system comprising a motor operatively connected to a wind turbine blade, wherein the secondary energy storage system is configured to only output energy to the yaw system; and
    operating the motor to turn the wind turbine blade from a position wherein the blades are not aligned with the wind to a position wherein the blades are aligned with the wind by performing a yaw maneuver in order to restart the wind turbine, based on the energy collected from a solar photovoltaic material secured on the wind turbine support structure and wherein the power is not based on energy drawn from a grid or from a nonrenewable generator.

13. The method of restarting the wind turbine of claim 12 wherein the wind turbine blade is turned in a clockwise direction.

14. The method of restarting the a wind turbine of claim 12 wherein the wind turbine blade is turned in a counter-clockwise direction.

15. The method of restarting the wind turbine of claim 12 further comprises converting the power generated by the wind turbine to a utility grid.

16. The method of restarting the wind turbine of claim 12 further comprising:
   managing the energy provided to the wind turbine by powering a control system.

17. The method of restarting the wind turbine of claim 16 wherein the control system is alerted to a grid power shortage.

18. The method of restarting the wind turbine of claim 12 wherein a control system automatically operates the motor.

19. The method of restarting the wind turbine of claim 18 wherein the control system automatically operates the motor in response to a power output maximum condition.

20. The method of claim 12, wherein the motor is operated to turn the wind turbine blade based on a remote-control signal.

* * * * *